(12) United States Patent
Hwang et al.

(10) Patent No.: US 8,014,095 B2
(45) Date of Patent: Sep. 6, 2011

(54) MIXED FORMAT DISK DRIVE

(75) Inventors: Kirk Hwang, Palo Alto, CA (US);
Michael A. Moser, San Jose, CA (US);
Spencer W. Ng, San Jose, CA (US)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 356 days.

(21) Appl. No.: 12/005,963

(22) Filed: Dec. 28, 2007

(65) Prior Publication Data
US 2009/0168230 A1    Jul. 2, 2009

(51) Int. Cl.
*G11B 5/09* (2006.01)
(52) U.S. Cl. ............................................ 360/48; 360/49
(58) Field of Classification Search .................. None
See application file for complete search history.

(56) References Cited

U.S. PATENT DOCUMENTS

| | | | |
|---|---|---|---|
| 5,765,201 A | | 6/1998 | Manges et al. |
| 6,028,725 A | * | 2/2000 | Blumenau .......................... 360/8 |
| 7,080,200 B2 | | 7/2006 | Hassner et al. |
| 7,089,391 B2 | | 8/2006 | Geiger et al. |
| 7,752,491 B1 | * | 7/2010 | Liikanen et al. ................... 714/8 |
| 7,827,378 B2 | * | 11/2010 | Feldman et al. .............. 711/202 |
| 2007/0025006 A1 | * | 2/2007 | Ichihara .......................... 360/31 |

OTHER PUBLICATIONS

Jacob, Bruce et al., "The Data Layer", *Memory Systems: Cache, DRAM, Disk*, (2005),Chapter 19.

* cited by examiner

*Primary Examiner* — Jason C Olson (57) ABSTRACT

A magnetic disk for a hard disk drive comprising a plurality of physical sector sizes is disclosed. The magnetic disk includes a first sector size area physically formatted according to a first physical sector size and a second sector size area physically formatted according to a second physical sector size different from the first sector size by a multiple of the first sector size wherein the second sector size can be presented externally as multiple sectors of said first sector size.

19 Claims, 6 Drawing Sheets

MIXED FORMAT DISK DRIVE

TECHNICAL FIELD

The present invention relates to the field of hard disk drive development, and more particularly to a mixed sector size format in a hard disk drive.

BACKGROUND ART

At least one hard disk drive (HDD) is used in almost all computer system operations. In fact, most computing systems are not operational without some type of HDD to store the most basic computing information such as the boot operation, the operating system, the applications, and the like. In general, the HDD is a device which may or may not be removable, but without which the computing system will generally not operate.

The basic HDD model includes a storage disk or hard disk that spins at a designed rotational speed. An actuator arm with a suspended slider is utilized to reach out over the disk. The slider is coupled with a suspension that supports both the body of the slider and a head assembly that has a magnetic read/write transducer or head or heads for reading/writing information to or from a location on the disk. The complete head assembly, e.g., the suspension, slider, and head, is called a head gimbal assembly (HGA).

In operation, the hard disk is rotated at a set speed via a spindle motor assembly having a central drive hub. There are tracks at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk as a string of bits.

Space is allocated on a disk by formatting the disk into a plurality of fixed size blocks. These blocks are sometimes referred to as sectors. The computer industry has been operating with a single standard sector size in products ranging from hard drives through to server arrays. Computers' BIOS, operating systems, and special applications such as databases also have the same standard sector size built-in. With advancements in hard drive technology, it may be beneficial to modify the size of the sector. However, modifying the sector size can cause problems when interfacing with legacy systems whose data are organized according to a different sector size.

SUMMARY

A magnetic disk for a hard disk drive comprising a plurality of physical sector sizes is disclosed. The magnetic disk includes a first data storage area physically formatted according to a first physical sector size and a second data storage area physically formatted according to a second physical sector size. The size of the second physical sector is a multiple of the first sector size, and a sector of the second size can be presented externally as multiple sectors of said first size.

BEST MODES FOR CARRYING OUT THE INVENTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The discussion will begin with an overview of a HDD and components connected therewith. The discussion will then focus on embodiments of a method and system for a mixed format disk drive. Embodiments of the present invention are directed to a disk drive including two different sector sizes where a first portion is formatted according to a first sector size, such as a legacy sector size, while a second portion is formatted according to a second sector size. Externally, the mixed format disk drive of the present invention presents a 512 byte logical interface to be compatible with legacy systems while also providing a larger sector size portion to enable greater data reliability and formatting efficiency.

Overview

In general, 4096 byte sectors can provide the necessary data reliability as well as formatting efficiency as areal density increases. However, much legacy software has been designed to work with the current standard 512 byte sector size. There a few ways to allow such software to work with a 4096 byte sector size. The first is to change the software to operate with a 4096 byte sector size. This is a difficult task due to the large volume of software involved. The second is for the drive with a 4096 byte sector size to provide a 512 byte sector size logical interface to the host, while underneath perform 512 byte emulation on the 4096 byte sector. Compatibility with legacy software can be achieved at the expense of performance when unaligned write is performed. An unaligned write either does not start at or end at a 4096 byte logical boundary or the block size is not a multiple of 4096 byte. Such an unaligned write requires a read-modify-write, which is a very slow process, thus reducing drive performance significantly.

Embodiments of the present invention provide a hard disk drive with a plurality of sector sizes. Specifically, the present invention provides a drive which enables use of legacy 512 byte sector sizes while simultaneously enabling use of a 4096 byte sector without requiring emulation. The disk drive of the present invention is compatible with legacy software while providing improved performance realized with a 4096 byte sector size.

The mixed format drive of the present invention includes a plurality of physically different sector sizes. In one embodiment, the mixed format disk drive includes a data area that is physically formatted as 512 byte in sector size and a data area that is physically formatted as 4096 byte in sector size. In one embodiment, the different sector sizes are pre-determined and fixed during manufacturing. Externally, to the user, the mixed format disk drive of the present invention presents each 4096 byte sector as eight separate 512 byte portions using the 512 byte logical interface.

Operation

Figure 1:
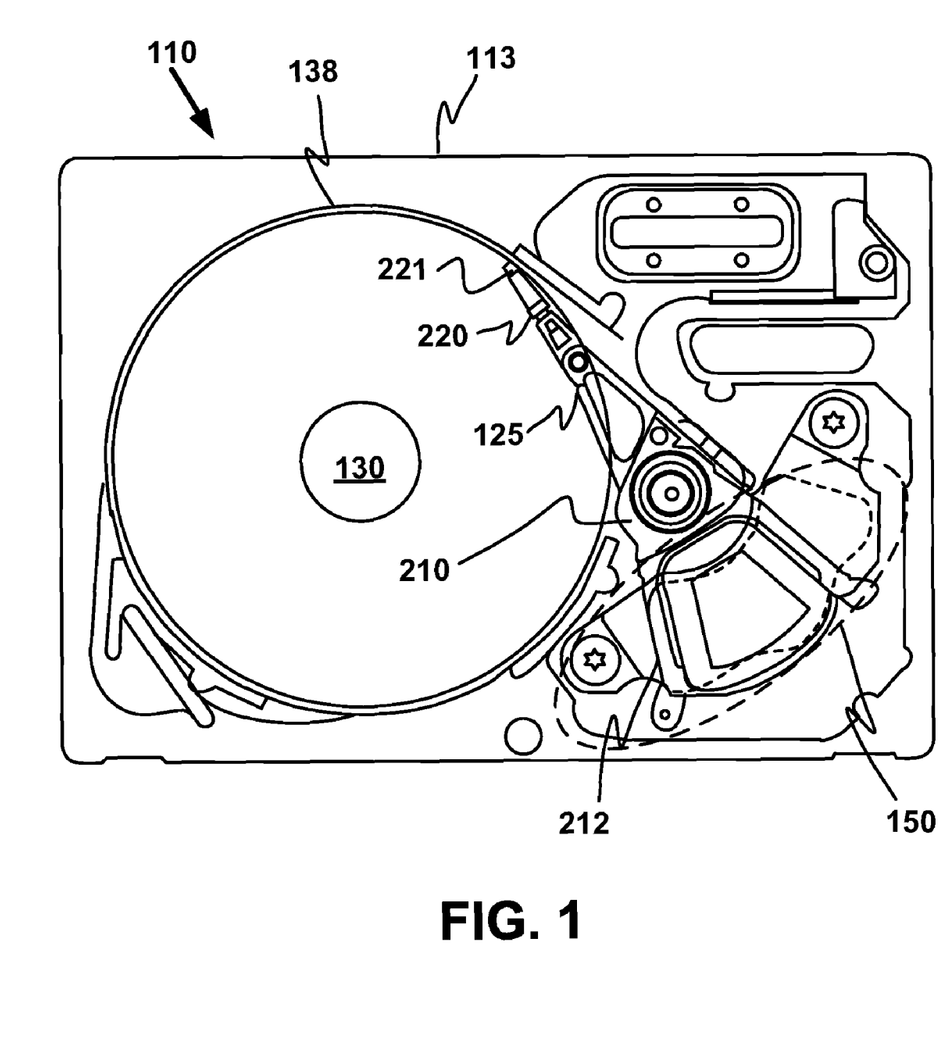
FIG. 1 is a plan view of a HDD in accordance with one embodiment of the present invention.

With reference now to FIG. 1, a schematic drawing of one embodiment of an information storage system including a magnetic hard disk file or HDD 110 for a computer system is shown. Although, only one head and one disk surface combination are shown, what is described herein for one head-disk combination is also applicable to multiple head-disk combinations. In other words, the present technology is independent of the number of head-disk combinations.

In general, HDD 110 has an outer housing 113 usually including a base portion (shown) and a top or cover (not shown). In one embodiment, housing 113 contains a disk pack having at least one media or magnetic disk 138. The disk pack (as represented by disk 138) defines an axis of rotation and a radial direction relative to the axis in which the disk pack is rotatable.

A spindle motor assembly having a central drive hub 130 operates as the axis and rotates the disk 138 or disks of the disk pack in the radial direction relative to housing 113. An actuator assembly 210 includes one or more actuator arms 125. When a number of actuator arms 125 are present, they are usually represented in the form of a comb that is movably or pivotally mounted to base/housing 113. A voice coil motor 150 is also mounted to base 113 for moving the actuator arms 125 relative to the disk 138.

In one embodiment, each actuator arm 125 has extending from it at least one cantilevered integrated lead suspension (ILS) 220. The ILS 220 may be any form of lead suspension that can be used in a data access storage device. The level of integration containing the slider 221, to which the read-write head is attached, and ILS 220, is called the Head Gimbal Assembly (HGA).

The ILS 220 has a spring-like quality, which biases or presses the air-bearing surface of slider 221 against disk 138 to cause slider 221 to fly at a precise distance from disk 138. ILS 220 has a hinge area that provides for the spring-like quality, and a flexing cable-type interconnect that supports read and write traces and electrical connections through the hinge area. A voice coil 212, free to move within a conventional voice coil motor magnet assembly 150 is also mounted to actuator assembly 210 opposite the head gimbal assemblies. Movement of the actuator assembly 210 by voice coil motor 150 causes the head mounted on slider 221 to move along radial arcs across tracks on the surface of disk 138.

Mixed Format Hard Drive

The mixed format drive of the present invention includes a plurality of physically different sector size areas. In one embodiment, the mixed format disk drive includes a data area that is physically formatted as 512 byte in sector size and a data area that is physically formatted as 4096 byte in sector size. In one embodiment, the different sector size areas are predetermined and fixed during manufacturing. Externally, to the user, the mixed format disk drive of the present invention presents each 4096 byte sector as eight separate 512 byte portions using the 512 byte logical interface.

Figure 2:
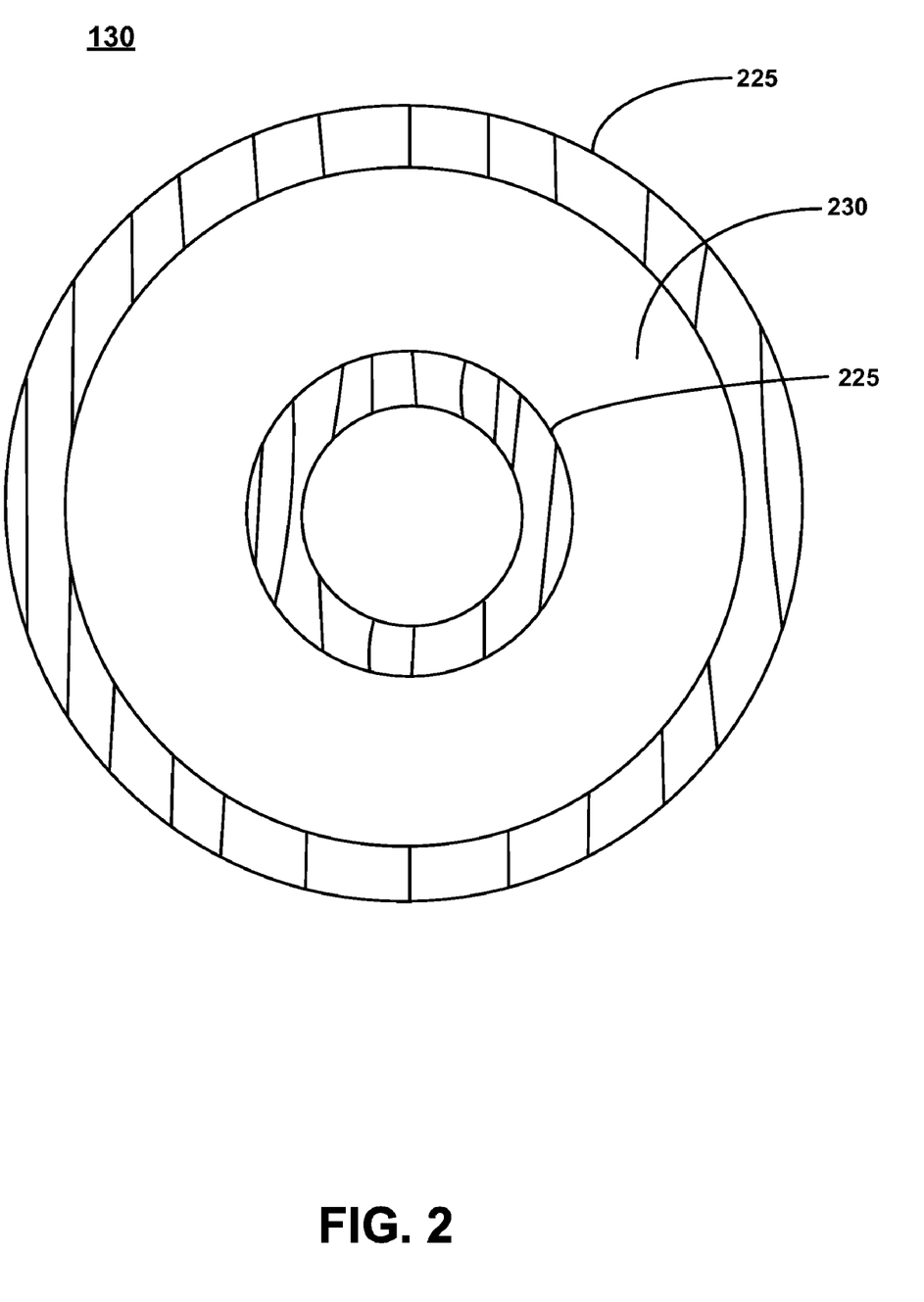
FIG. 2 is an illustration of a magnetic disk with different physical sector sizes in accordance with one embodiment of the present invention.

FIG. 2 is an illustration of a magnetic disk 130 with different physical sector size data areas in accordance with one embodiment of the present invention. Disk 130 includes a data area formatted according to a first physical sector size 225 and a data area formatted according to a second physical sector size 230. In one embodiment, data areas 225 are formatted according to a 512 byte physical sector size and data area 230 are formatted according to a 4 kilobyte physical sector size. In this embodiment, the second physical size is a multiple of eight with respect to the first physical size.

Although embodiments of the present invention will be described according to a disk drive with data areas formatted according to two different physical sector sizes of 512 and 4096 bytes, it is appreciated that embodiments of the present invention are well suited to be used with sector sizes other than 512 and 4096 bytes, any number of sector sizes and can include any number of different sector size areas.

Figure 3:
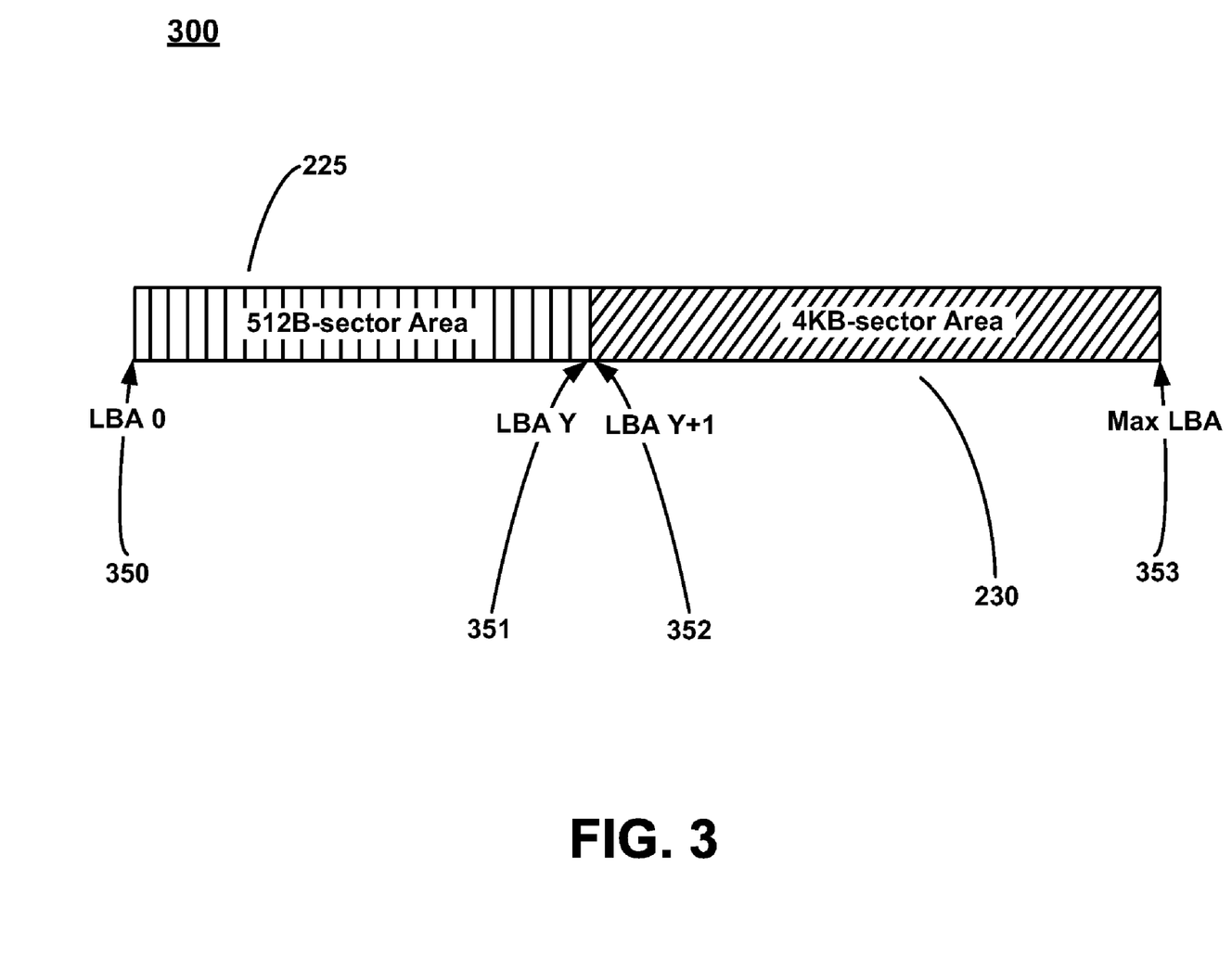
FIG. 3 is a block diagram illustrating a 512 byte sector area physically adjacent to a 4096 byte sector area in accordance with one embodiment of the present invention.

FIG. 3 is a block diagram 300 of the linear address space of a disk drive illustrating a 512 byte sector area 225 physically adjacent to a 4096 byte sector area 230 in accordance with one embodiment of the present invention. In this embodiment, the 512 byte sector area 225 starts at Logical Block Address (LBA) 0 350 and ends at LBA Y 351, indicating that the 512 byte sector area is physically contiguous on the disk. The 4096 byte sector area begins at LBA (Y+1) 352 and ends at Max LBA, indicating that the 4096 byte sector area is physically contiguous on the disk.

The mixed format disk drive of the present invention is internally portioned into separate areas in accordance with one embodiment of the invention. The different sizes of the areas are predetermined and fixed during manufacturing of the disk drive. Externally to the user, each physical 4096 byte sector has eight 512 byte LBAs. For example, the user accesses the 4096 byte sector using a 512 byte logical interface.

Figure 4:
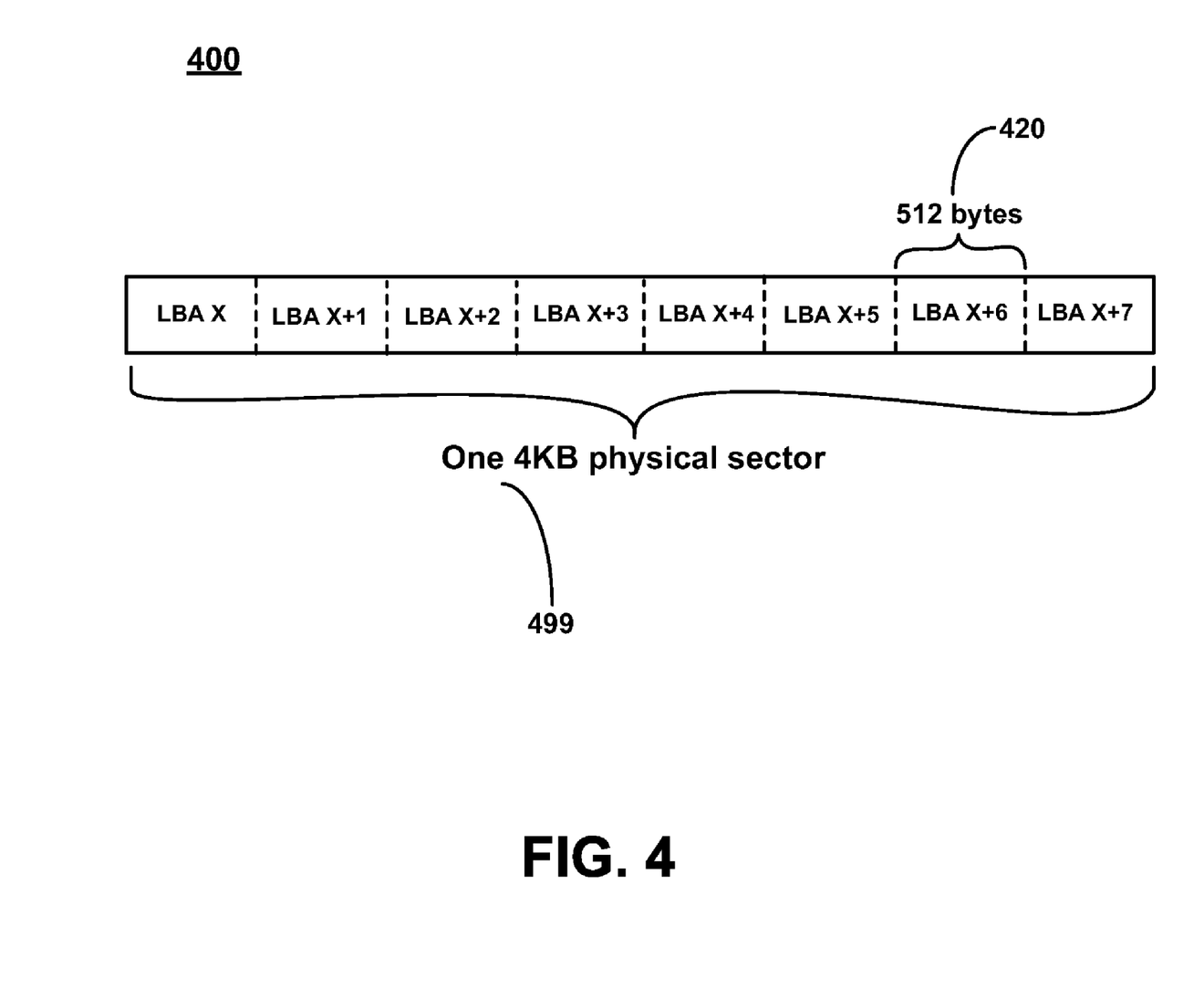
FIG. 4 is a block diagram of a 4096 byte sector logically portioned into eight 512 byte sectors in accordance with one embodiment of the present invention.

FIG. 4 is a block diagram 400 of a 4096 byte sector 499 logically portioned into eight 512 byte sectors 420 in accordance with one embodiment of the present invention. The 4096 byte sector 499 can be externally presented as eight 512 Byte sectors, as indicated by the LBA assigned to each of the 512 byte sectors. The LBAs of the eight 512 byte sectors are labels as LBA X through LBA X+7.

The mixed format disk drive of the present invention has two physically different sector sizes of which can be presented externally as one single legacy sector size. By using this presentation scheme, a legacy system designed for use with 512 byte sectors can be used successfully with the 512 byte sector area without requiring read-modify-writes caused by unaligned writes that can occur when 512 byte sector size is emulated on 4096 byte sector size. Alternatively, and additionally, the drive also provides 512 byte sector size emulation in the 4096 byte sector area. Software that has already been prepared to work with such emulation will not issue unaligned writes and will not incur any read-modify-write performance penalty. Software that has not yet been prepared to work with such emulation will still function properly, but will incur the performance penalty of read-modify-write when unaligned writes are issued.

As described above, the different physical sector areas can be physically contiguous. Alternatively, the 512 byte and 4096 byte sector areas can be physically non-contiguous, but still logically contiguous, based on the LBAs of the physical sectors.

Figure 5:
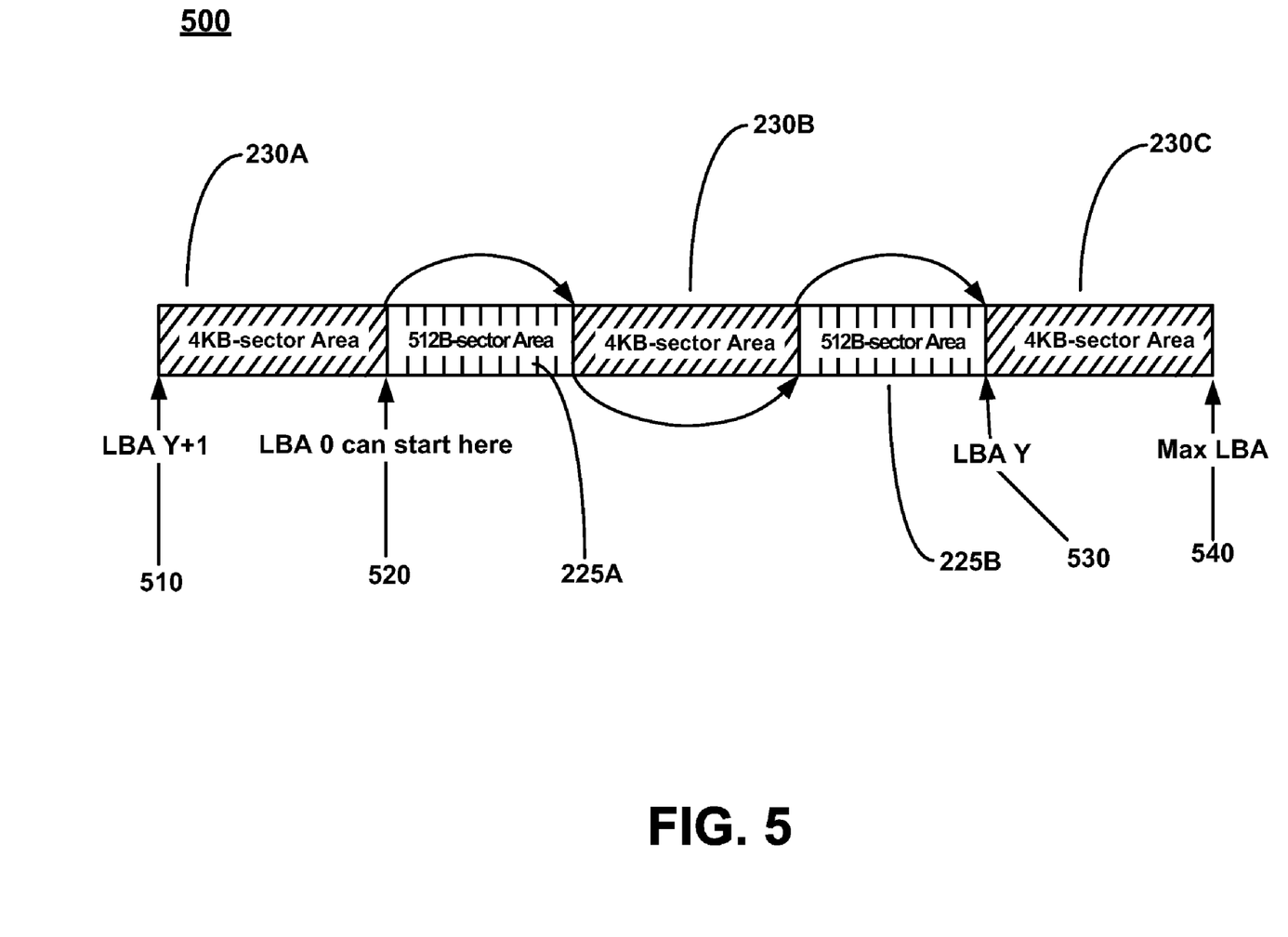
FIG. 5 is a block diagram illustrating physically non-contiguous but logically contiguous sector areas of different physical size in accordance with one embodiment of the present invention.

FIG. 5 is a block diagram 500 of the linear address space of a disk drive illustrating physically non-contiguous but logically contiguous sector areas of different physical size in accordance with one embodiment of the present invention. A first portion of the 512 byte-sector area 225A starts at LBA 0 520, and ends just before a 4096 byte-sector area 230B, skips over it, and resumes in a second portion of the 512 byte-sector area 225B, and ends at LBA Y 530. A first portion of the 4096 byte-sector area 230A starts at LBA (Y+1) 510, and ends just before the first 512 byte-sector area 225A, skips over it, and resumes in a second portion of the 4096 byte-sector area 230B, and ends just before the second 512 byte-sector area 225B, skips over it, and resumes in a third portion of the 4096 byte-sector area 230C, and ends at Max LBA 540. In this embodiment, the different sector size areas are not physically contiguous but are logically contiguous based on the LBAs.

In one embodiment of the invention, the user is made aware of the logical boundary between the 512 byte area and the 4096 byte area. In one embodiment, this information can be returned to the user in "Identify" command. To the user (or host), the mixed format disk drive of the present invention appears as a 512 byte logical interface. However, the drive is physically portioned into different sector size areas. In one embodiment, the disk drive can be portioned into two partitions, one partition designated for 512 byte sectors and another partition for the 4096 byte sector area.

In one embodiment, a lower recording density (e.g., better signal to noise ratio) is used in the 512 byte sector area and a higher recording density is used in the 4096 byte sector area.

Figure 6:
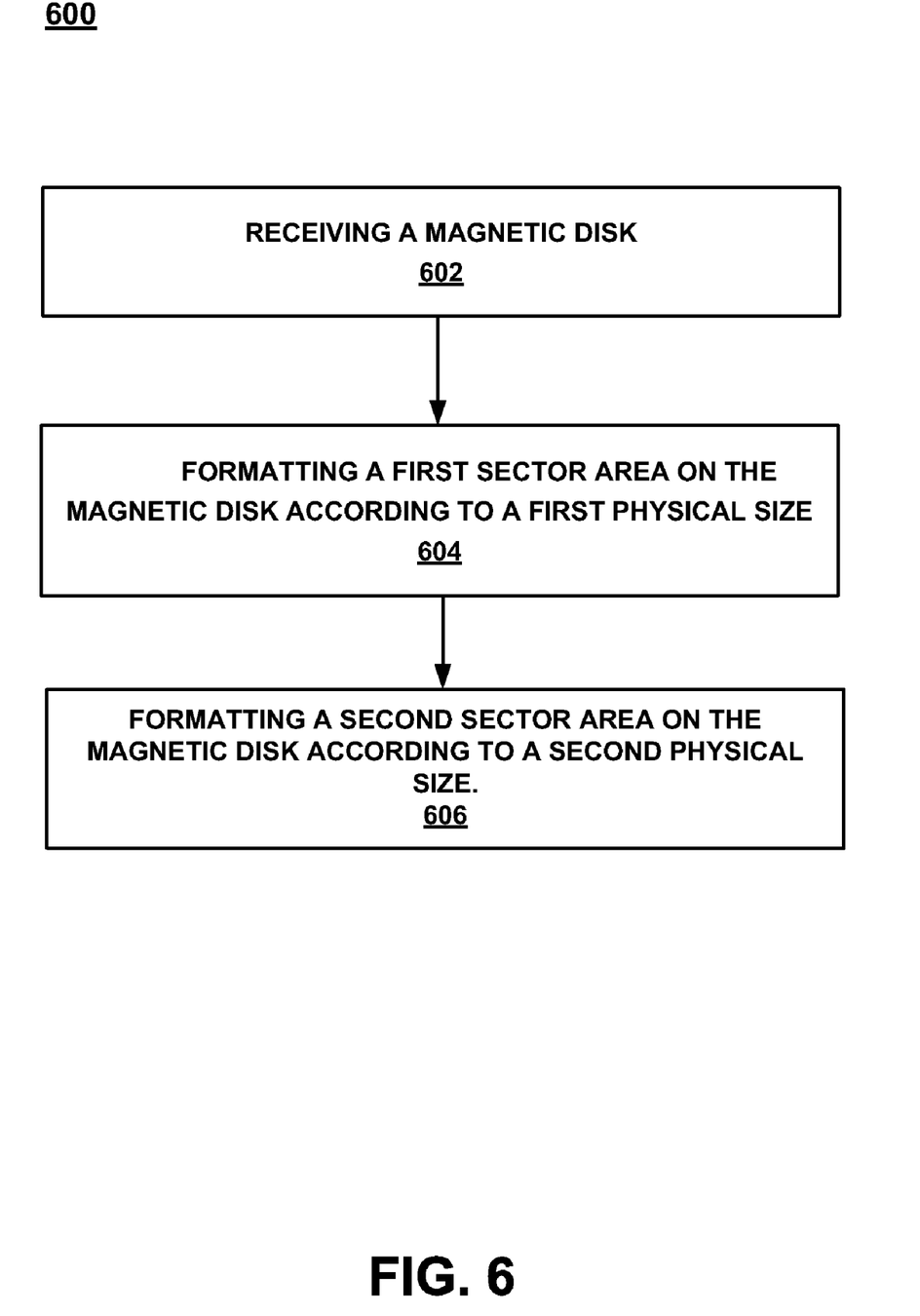
FIG. 6 is a flowchart of a method for manufacturing a hard disk drive with mixed physical sector format sizes in accordance with one embodiment of the present invention.

FIG. 6 is a flowchart of a method 600 for manufacturing a hard disk drive with mixed physical sector format sizes in accordance with one embodiment of the present invention.

At 602, 600 includes receiving a magnetic disk. In one embodiment, 602 includes accessing a plurality of magnetic disks.

At 604, 600 includes formatting a first data area on the magnetic disk according to a first physical sector size. In one embodiment, the first size is a 512 byte physical sector size.

At 606, 600 includes formatting a second data area on the magnetic disk according to second physical sector size. In one embodiment, the second size is a 4096 byte physical sector size.

In one embodiment, the first sector size area and second sector size area are each physically contiguous. In another embodiment, the first sector size area and second sector size area are each physically non-contiguous, but still logically contiguous. In one embodiment, the first and second sector sizes are a multiple of each other.

Thus, embodiments of the present invention provide a method and apparatus for a mixed format disk drive including data areas formatted according to different physical sector sizes.

Moreover, the present embodiments enable functionality with legacy systems utilizing a 512 byte sector size in addition to providing improved performance associated with using a 4096 byte sector size. In use, the mixed format drive presents itself externally as a 512 byte logical interface drive and a 4096 byte sector is accessed using a 512 byte logical interface.

Example embodiments of the present technology are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A magnetic disk for a hard disk drive comprising:
a first sector size area physically formatted according to a first physical sector size; and
a second sector size area physically formatted according to a second physical sector size different from said first sector size by a multiple of said first sector size wherein said second sector size area comprises externally presented multiple separate sectors of said first sector size.

2. The magnetic disk of claim 1 wherein said first physical sector size is 512 data Bytes.

3. The magnetic disk of claim 1 wherein said second physical sector size is 4096 data Bytes.

4. The magnetic disk of claim 1 wherein said second physical sector size is a multiple of eight with respect to said first physical sector size.

5. The magnetic disk of claim 1 wherein said first sector size area of said first physical sector size and said second sector size area of said second physical sector size are each physically contiguous on said magnetic disk.

6. The magnetic disk of claim 1 wherein said first sector size area of said first physical sector size and said second sector size area of said second physical sector size are each physically non-contiguous on said magnetic disk.

7. The magnetic disk of claim 6 wherein said first sector size area of said first physical sector size and said second sector size area of said second physical sector size are each physically non-contiguous but are logically contiguous on said magnetic disk.

8. A disk drive system comprising:
a housing;
a motor assembly coupled with said housing, said motor assembly for rotating a magnetic disk, said magnetic disk comprising:
a first sector size area physically formatted as a first physical sector size; and
a second sector size area physically formatted as a second sector size different from said first sector size by a multiple of said first sector size wherein said second sector size area comprises externally presented multiple separate sectors of said first size.

9. The disk drive of claim 8 wherein said first physical sector size is 512 data Bytes.

10. The disk drive of claim 8 wherein said second physical sector size is 4096 data Bytes.

11. The disk drive of claim 8 wherein said second physical sector size is a multiple of eight with respect to said first physical sector size.

12. The disk drive of claim 8 wherein said first sector size area of said first physical sector size and said second sector size area of said second physical sector size are each physically contiguous on said magnetic disk.

13. The disk drive of claim 8 wherein said first sector size area of said first physical sector size and said second sector size area of said second physical sector size are each physically non-contiguous on said magnetic disk.

14. The disk drive of claim 13 wherein said first sector size area of said first physical sector size and said second sector size area of said second physical sector size are each physically non-contiguous but are each logically contiguous on said magnetic disk.

15. A method for manufacturing a hard disk drive comprising:
- receiving a magnetic disk;
- formatting a first sector size area on said magnetic disk according to a first physical sector size;
- formatting a second sector size area on said magnetic disk according to a second physical sector size; and
- presenting each sector of a portion of said second sector size area externally as multiple separate sectors of said first sector size.

16. The method of claim 15 further comprising:
formatting said first sector size area according to a 512 byte physical sector size.

17. The method of claim 15 further comprising:
formatting said second sector size area according to a 4096 byte physical sector size.

18. The method of claim 15 further comprising:
formatting said first and second sector size areas such that said first sector size area of said first sector size and said second sector size area of said second sector size are each physically contiguous on said magnetic disk.

19. The method of claim 15 further comprising:
formatting said first and second sector size areas such that said first sector size area of said first sector size and said second sector size area of said second sector size are each physically non-contiguous but are logically contiguous on said magnetic disk.

* * * * *